W. LOWDEN.
Scythe.
No. 89,778.
Patented May 4, 1869.
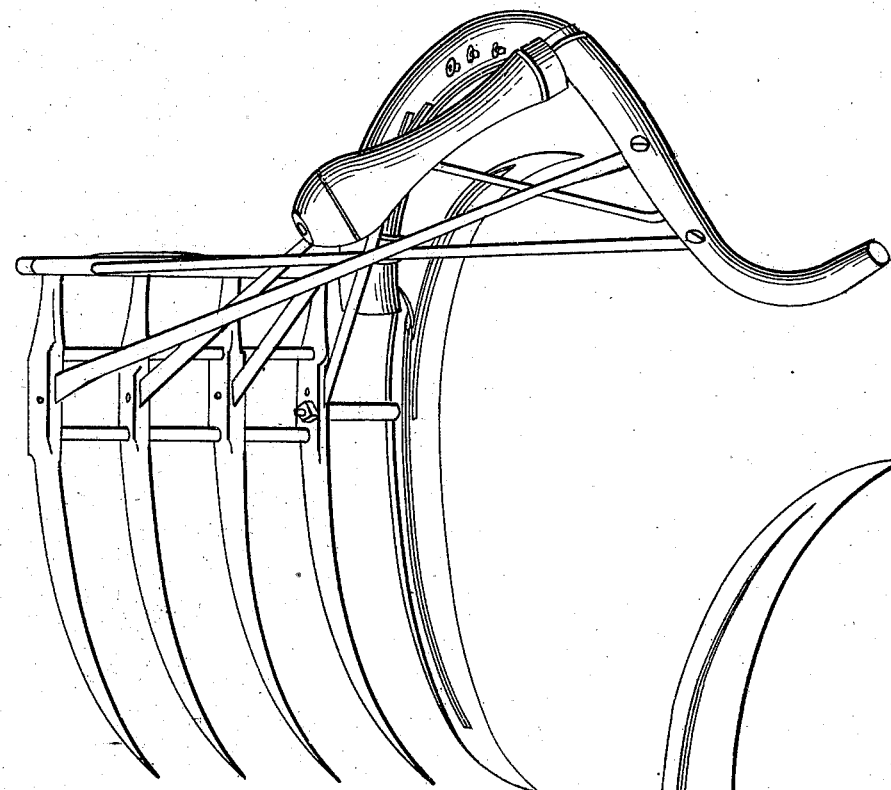
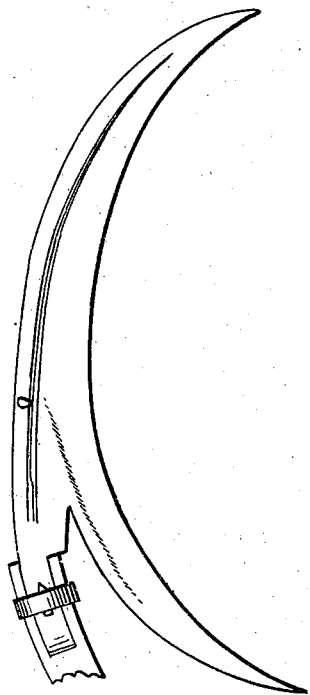

United States Patent Office.

WILLIAM LOWDEN, OF THORNAPPLE, MICHIGAN.

Letters Patent No. 89,778, dated May 4, 1869.

IMPROVEMENT IN SCYTHES.

The Schedule referred to in these Letters Patent and making part of the same.

*To all whom it may concern:*

Be it known that I, WILLIAM LOWDEN, of the town of Thornapple, in the county of Barry, and State of Michigan, have invented a new and improved "Grass and Grain-Scythe," for mowing grass or reaping grain; and I do hereby declare that the following is a full, clear, and exact description of the construction and operation of the same, reference being had to the annexed drawings, making a part of this specification, in which—

Figure 1 represents the scythe, as adjusted to a grain-cradle.

Figure 2, the scythe alone, which is similar to an ordinary scythe, with the exception of the extension of the blade of the scythe back of the heel in the form of an arc, a distance of twelve to sixteen inches, so as to cut the grass or grain that would, without such extension of the blade, slip by the heel of the scythe in mowing or cradling, and remain uncut.

This scythe I designate "The Lightning Scythe." It is made of iron and steel, as are ordinary scythes, and may be attached to and used on most kinds of snaths, for grass or grain-scythes.

What I claim as my invention, and desire to secure by Letters Patent, is—

The extension of the blade of the scythe back of the heel, in the form of an arc, which will cut the grass or grain that would, without such extended blade, slip by the heel, and remain uncut, as herein described.

WILLIAM LOWDEN.

Witnesses:
JOHN A. MARTIN,
HARVEY WRIGHT.